Figure 1:
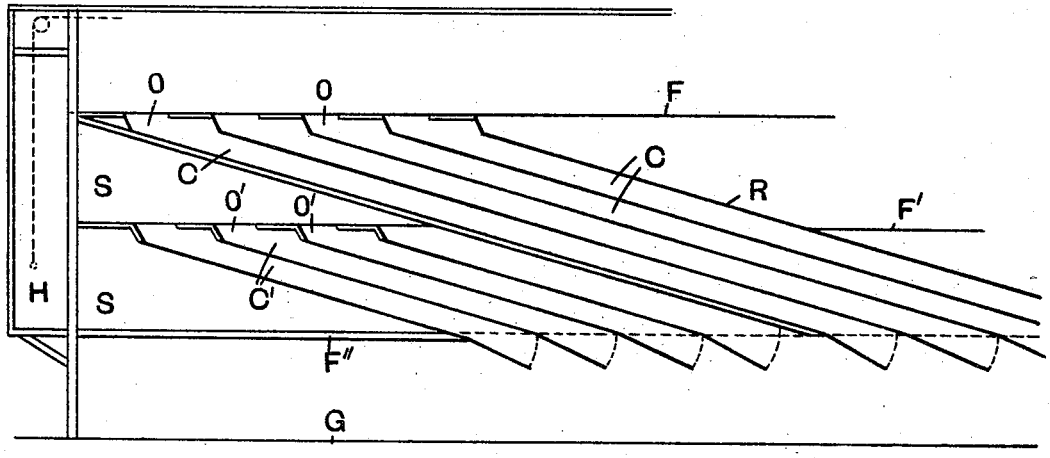

No. 699,690. Patented May 13, 1902.
R. E. LEETHAM.
STRUCTURE FOR STORAGE AND DELIVERY OF MERCHANDISE.
(Application filed July 9, 1901.)
(No Model.) 8 Sheets—Sheet 1.

No. 699,690. Patented May 13, 1902.
R. E. LEETHAM.
STRUCTURE FOR STORAGE AND DELIVERY OF MERCHANDISE.
(Application filed July 9, 1901.)
(No Model.) 8 Sheets—Sheet 3.

No. 699,690. Patented May 13, 1902.
R. E. LEETHAM.
STRUCTURE FOR STORAGE AND DELIVERY OF MERCHANDISE.
(Application filed July 9, 1901.)
(No Model.) 8 Sheets—Sheet 4.

Witnesses:
Norris H. Clark.
Mary H. Watkins.

Inventor:
Richard Edmund Leetham,
by George F. Rohrbach,
his Attorney.

THE NORRIS PETERS CO., PHOTO-LITHO., WASHINGTON, D. C.

No. 699,690. Patented May 13, 1902.
R. E. LEETHAM.
STRUCTURE FOR STORAGE AND DELIVERY OF MERCHANDISE.
(Application filed July 9, 1901.)
(No Model.) 8 Sheets—Sheet 5.

Witnesses:
Norris H. Clark.
Mary H. Stathius.

Inventor:
Richard Edmund Leetham,
by George P. Whittlesey,
his Attorney.

No. 699,690. Patented May 13, 1902.
R. E. LEETHAM.
STRUCTURE FOR STORAGE AND DELIVERY OF MERCHANDISE.
(Application filed July 9, 1901.)
(No Model.) 8 Sheets—Sheet 6.
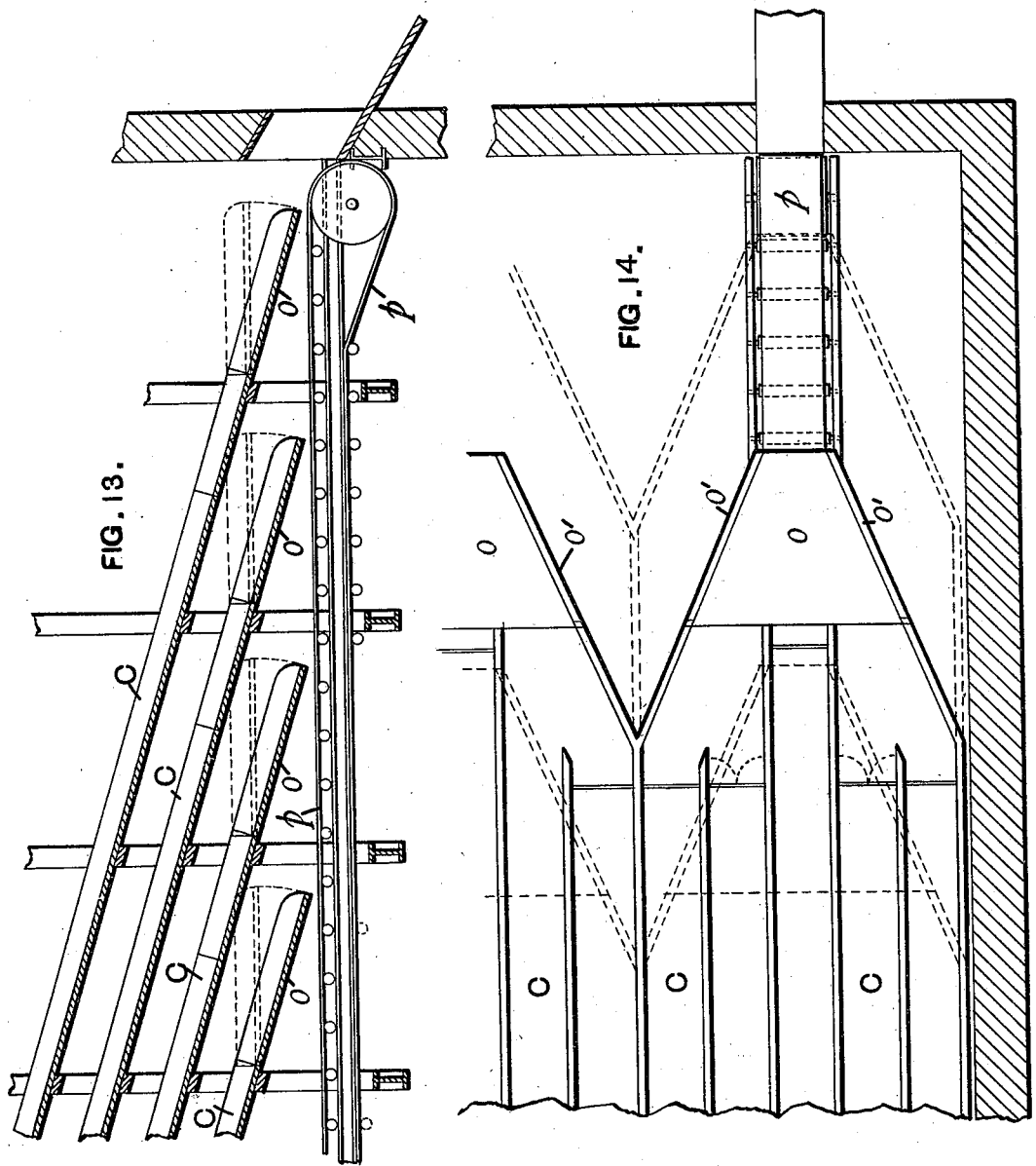

No. 699,690. Patented May 13, 1902.
R. E. LEETHAM.
STRUCTURE FOR STORAGE AND DELIVERY OF MERCHANDISE.
(Application filed July 9, 1901.)
(No Model.) 8 Sheets—Sheet 7.
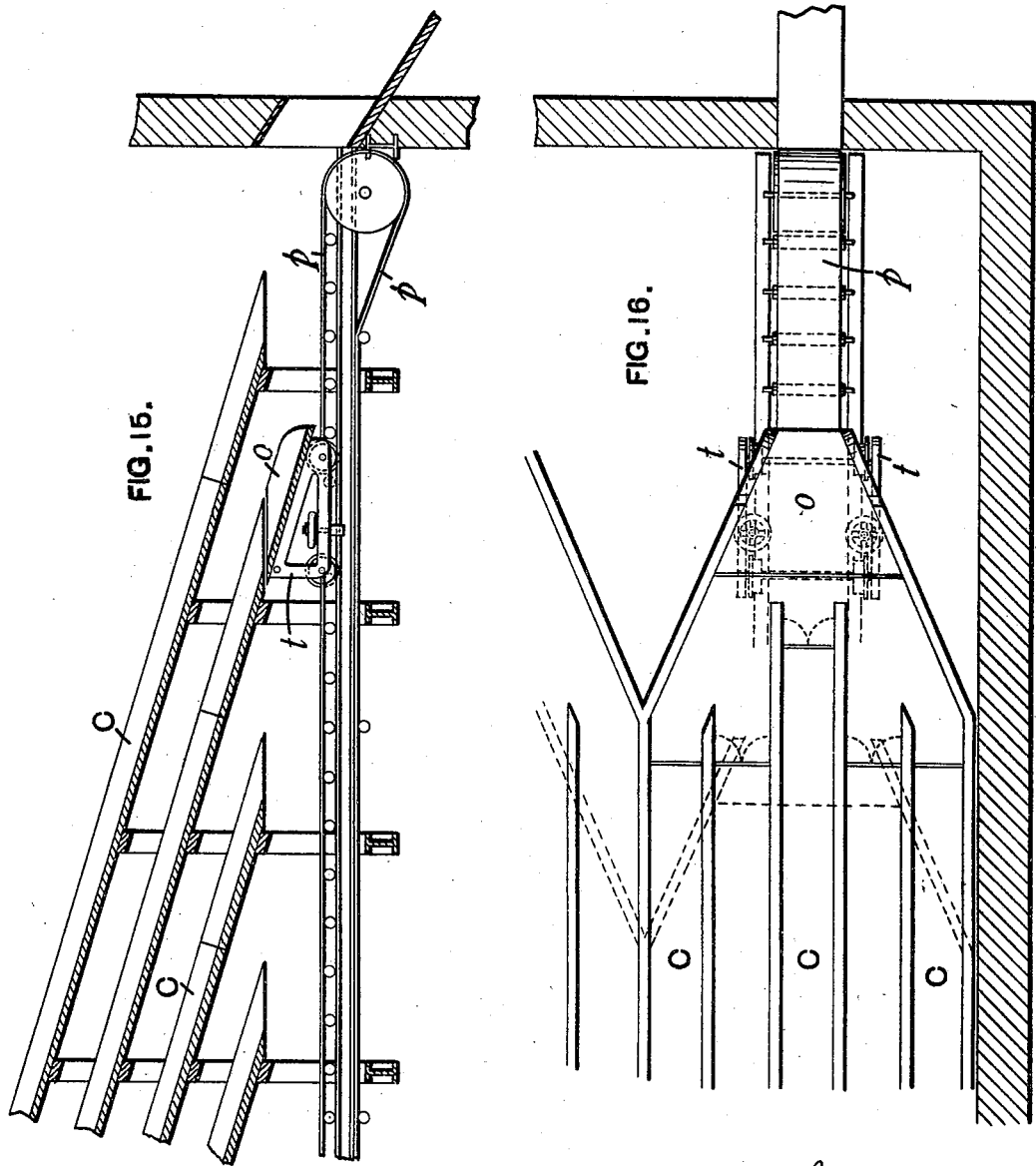

No. 699,690.　　　　　　　　　　　　　　Patented May 13, 1902.
R. E. LEETHAM.
STRUCTURE FOR STORAGE AND DELIVERY OF MERCHANDISE.
(Application filed July 9, 1901.)
(No Model.)　　　　　　　　　　　　　　　　8 Sheets—Sheet 8.
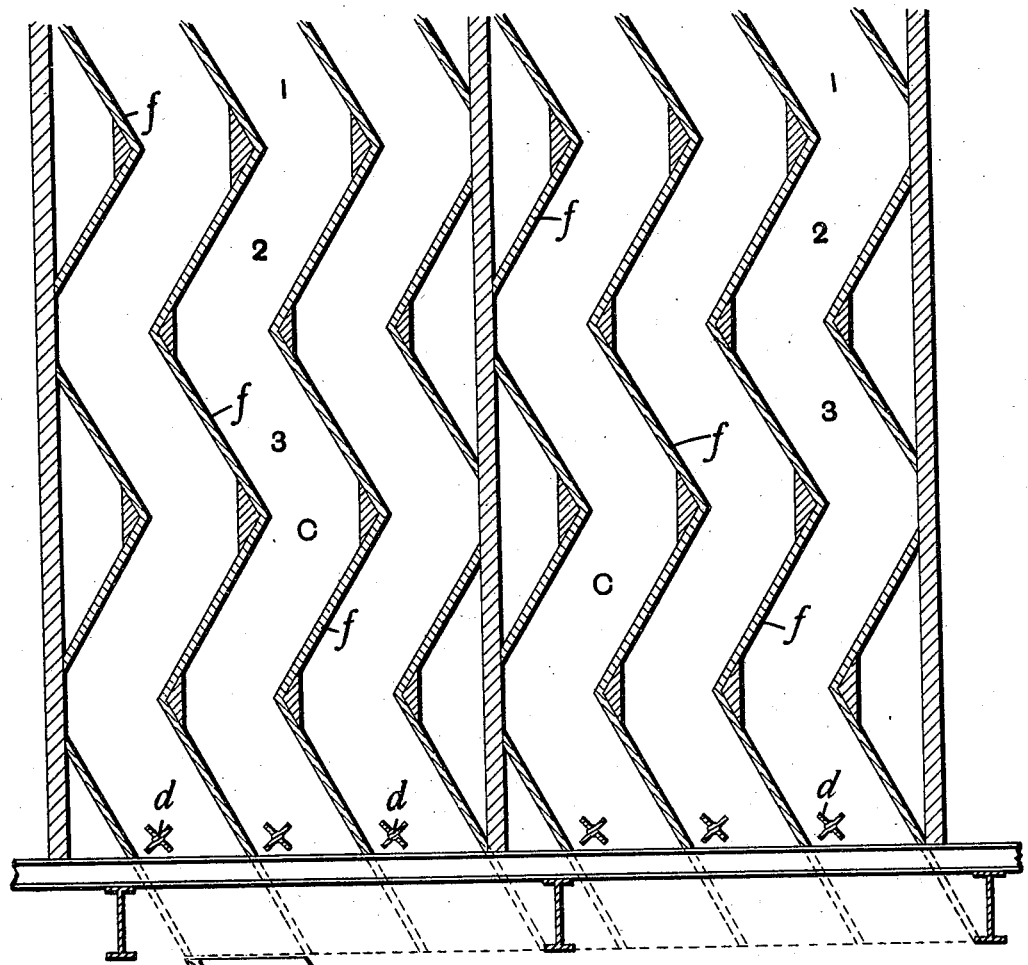
FIG. 17.
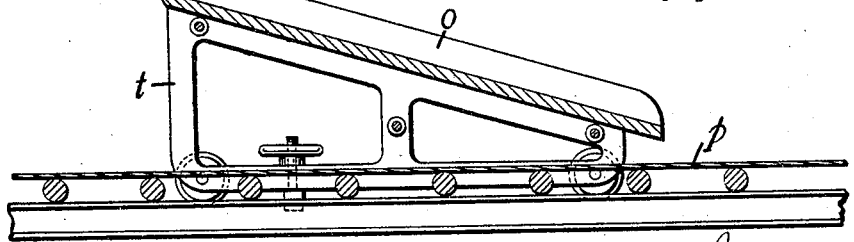

UNITED STATES PATENT OFFICE.

RICHARD EDMUND LEETHAM, OF YORK, ENGLAND.

STRUCTURE FOR STORAGE AND DELIVERY OF MERCHANDISE.

SPECIFICATION forming part of Letters Patent No. 699,690, dated May 13, 1902.

Application filed July 9, 1901. Serial No. 67,663. (No model.)

*To all whom it may concern:*

Be it known that I, RICHARD EDMUND LEETHAM, a citizen of the British Empire, residing at York, in the county of York, England, have invented certain new and useful Improvements in Structures for the Storage and Delivery of Articles of Merchandise, of which the following is a full, clear, and exact description.

This invention relates to structures for the storage and delivery of merchandise, such as grain, flour and other grain products in sacks, cotton and wool in bales, packed or canned articles in boxes, and the like. Such a structure constructed to embody my improvements comprises a plurality of contiguous compartments having inclined floors or bearing-surfaces which are open at their upper ends and which are provided at their lower ends with doors, flaps, stops, carriers, and other devices serving to temporarily retain the articles in the compartments and to control their delivery therefrom. When an article is delivered to any compartment, it slides downward therein under the action of gravity until arrested by the device at the lower end. Other articles being introduced successively they also slide down until stopped by the articles already in the compartment until the compartment is filled. Different articles or different grades of the same article can be delivered to different compartments and be stored therein and delivered at will therefrom. Each compartment is constructed to have a cross-section not greatly exceeding in its internal dimensions the cross-section of the articles to be stored in it, so that one of the articles cannot pass below the one preceding it in that compartment. The lowest article or several of the lower articles may be withdrawn or delivered from any one of the compartments by temporarily removing, operating, or displacing the outlet-controlling device. At the foot of each compartment or of a series of compartments there can be arranged a chute or inclined tray, which serves to guide the articles issuing from the compartments to a selected point of delivery, such as a conveyer-band, a railroad-wagon, a vessel, or the like.

I will more particularly describe my said structure and appurtenances with reference to the accompanying drawings, in which—

Figure 2:
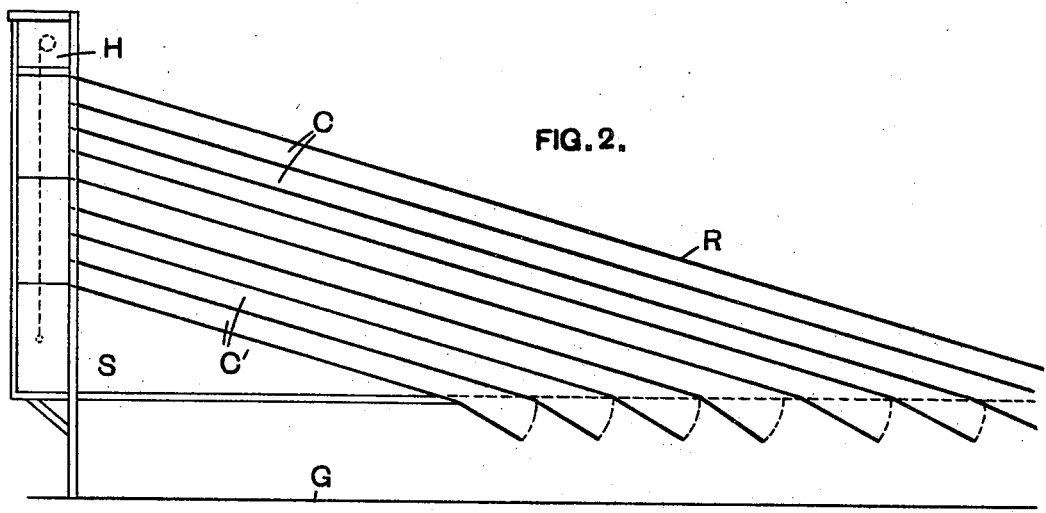
Figure 3:
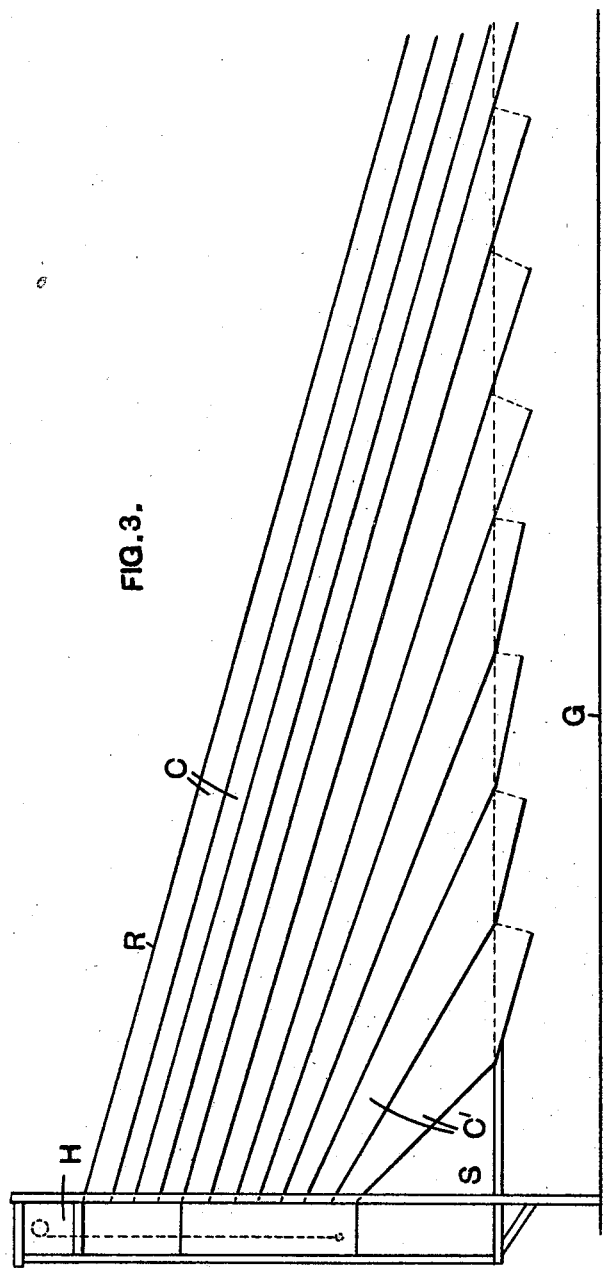
Figure 4:
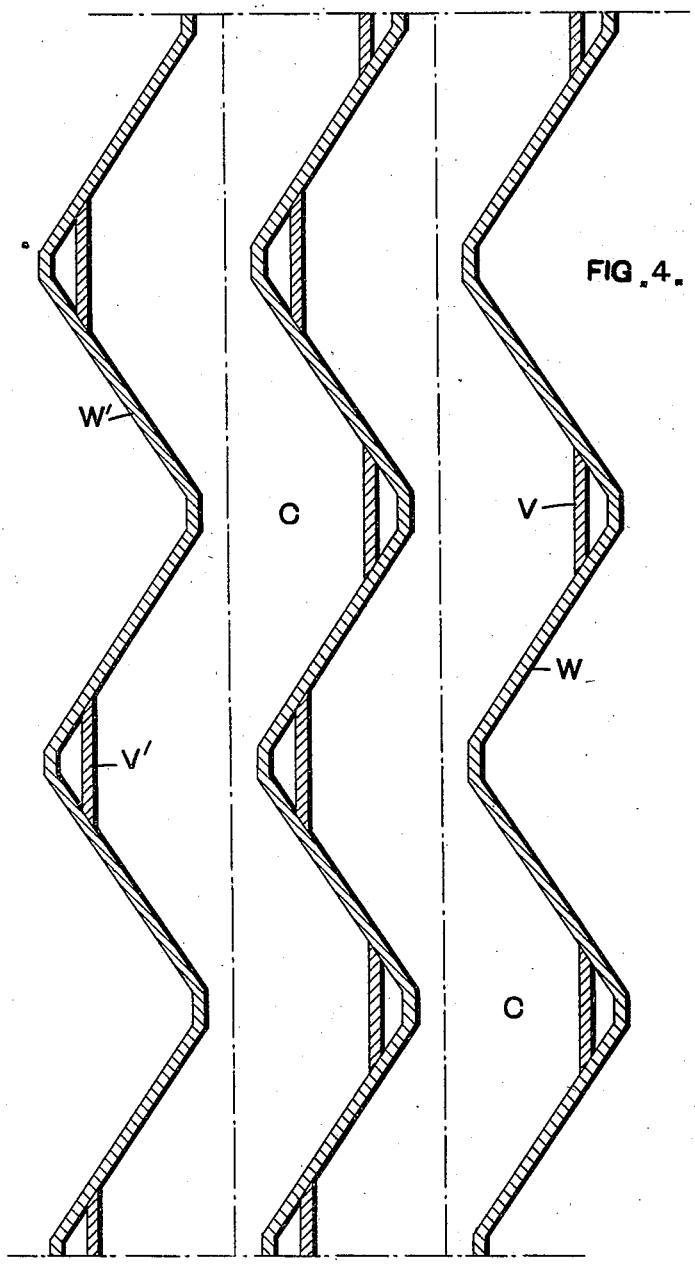
Figure 5:
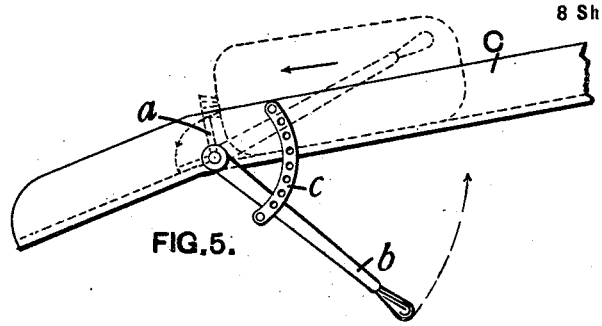
Figure 9:
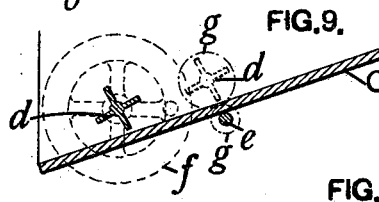
Figure 10:
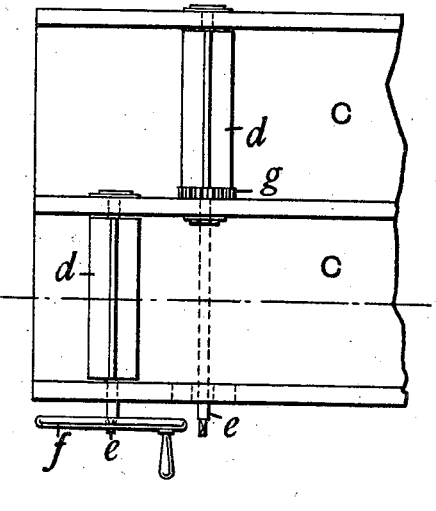
Figure 11:
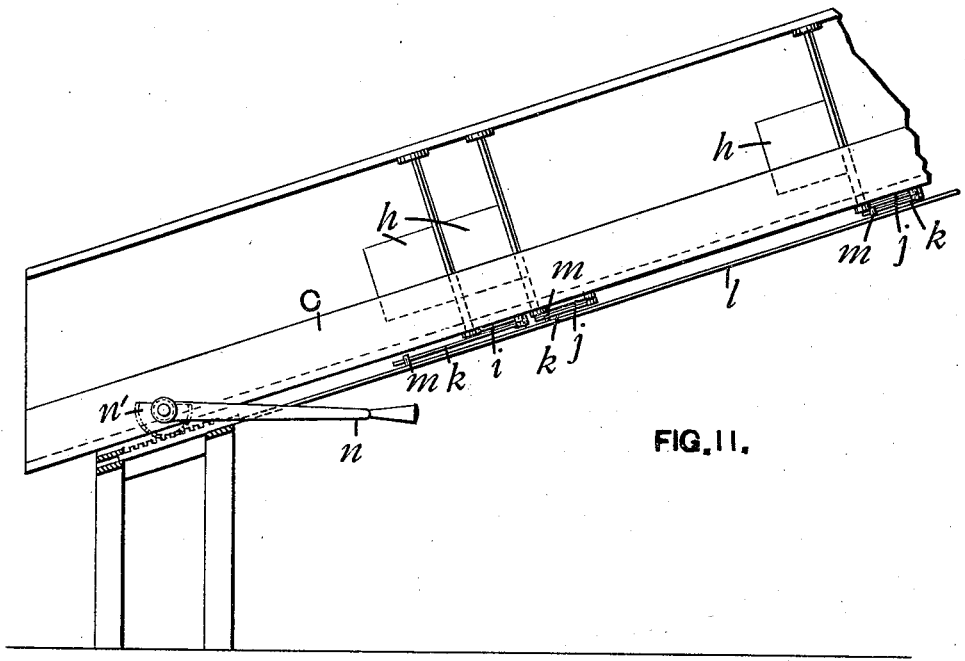
Figure 12:
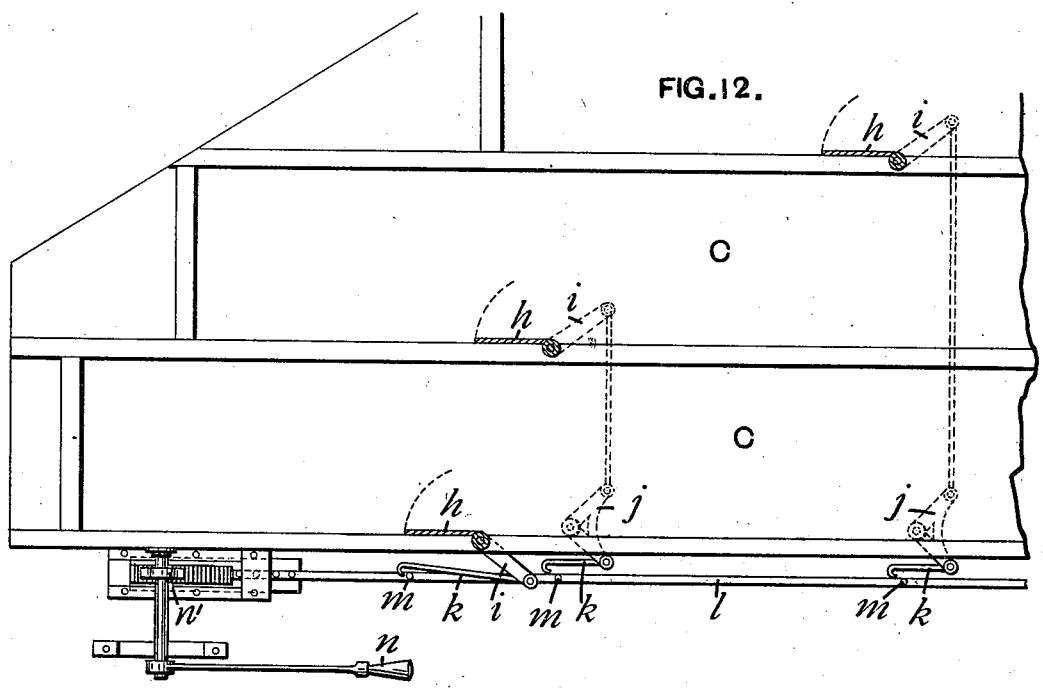

Figure 1 represents diagrammatically an arrangement of the compartments in which all of them are supplied from horizontal floors. Fig. 2 shows a modification in which all the compartments are supplied from a hoist or elevator. Fig. 3 shows a further modification in which also all the compartments are supplied from a hoist. These diagrams represent vertical longitudinal sections. Fig. 4 is a partial sectional plan taken parallel with the floor of a compartment having a relatively steep inclination. Fig. 5 shows a side elevation of a simple retarding device, and Fig. 6 the same device in plan. Fig. 7 shows in vertical section, and Fig. 8 in plan, a device comprising a roller in each compartment acting to retain or deliver the articles at will. Figs. 9 and 10 represent in vertical section and plan, respectively, a modification of the device shown in Figs. 7 and 8. Figs. 11 and 12 illustrate in elevation and plan, respectively, temporary stops put into action to prevent the delivery of the higher articles in a compartment while lower articles are being delivered. Figs. 13 and 14 show in vertical section and in sectional plan, respectively, means for temporarily retaining the articles in the compartments and for delivering articles from a plurality of compartments to a common point. Figs. 15 and 16 show in vertical section and sectional plan, respectively, a modification of the construction shown by Figs. 13 and 14 and a transportable tray or device through which articles from a compartment or several compartments may be delivered to a common point. Fig. 17 illustrates in vertical section a further modification of the compartment and transportable tray.

I hereinafter assume that the structure is employed in connection with a flour-mill or a flour store or warehouse, because this is a typical application of my invention, and any modification which may be necessary for other uses will be obvious without further description.

Referring to Fig. 1, F indicates the floor of the packing-room, in which there are a plurality of openings O O, each of which corresponds with the upper end of one of the compartments C C, extending through two floors. In the lower floor F' there is another series of openings O' O', with compartments C' therefrom extending through one floor only. All the compartments have their outlets through the lower floor F'' above the ground level or floor G. The spaces S below the upper ends of the compartments may be used, for example, as passages to the hoist H. Each compartment has a rectangular cross-section, and its sides and floor are constructed of longitudinally-arranged boards when the structure is made of timber. The outer range of compartments may be roofed at R to protect the articles therein from the weather when their length extends beyond the roof of the floor F. The vertical divisions between the compartments need not be continuous. It will suffice if they be fences or guards adequate to prevent any article leaving its own compartment.

The construction illustrated by the diagram Fig. 2 is substantially identical with that shown in Fig. 1. The difference is that all the compartments C C are carried through the wall of the hoist H and are consequently supplied from the hoist exclusively.

The further modification illustrated by the diagram Fig. 3 differs from that shown by Fig. 2 in having the lower compartments constructed at a greater inclination than the upper compartments in such a manner that the outlets are more distributed over the ground area. These shorter and steeper compartments are adapted for the storage and delivery of lighter articles, such as sacks of bran. For sacks of flour the compartments may be constructed with a fall of from three to four inches per foot linear when their floors are laid with longitudinal boards. If the floors be cross-boarded or if the coefficient of friction be higher than that of sacks of flour on longitudinal boards, the fall must be increased; but the best amount of fall or inclination is easily found in every case by a simple experimental trial.

When the inclination of the compartments is greater than is sufficient to permit the articles to slide at the moderate speed required for the purpose of my invention—as, for example, in the case of the shorter compartments illustrated in Fig. 3—I so construct the sides of the compartments that the paths of the articles through them cannot be in a straight line, and so, therefore, that they can gain no acceleration of speed in their downward passage. This can obviously be contrived in various ways—as, for example, by fixing deviators alternately on the right and left sides of a compartment or by making the walls of the compartments deviate alternately to the right and left of an imaginary mean straight line in such a manner that a zigzag or sinuous path of uniform or approximately uniform width is thereby produced through the whole or part of the length of a compartment. Such a construction is illustrated by Fig. 4, where W W' indicate the zigzag walls of the compartment. To prevent jamming, the angles are filled in with vertical boards or fillers V V'. It is advantageous to have each of the walls W W' of about the length of a sack of flour or bran and to arrange that the inner angles of the walls do not approach the median line of the compartment, so that there is a narrow clear straight opening, as shown in the figure, from the top to the bottom of the compartment. The inclination near the upper part of each compartment may be increased or modified for a short distance if it be required to give the articles delivered to it a good start or impetus, as will principally be governed by the means adopted in delivering the articles to the compartment. If they already have an impetus when so delivered, it will not be necessary to make the upper part of the compartment steeper. In like manner the inclination near the lower end of each compartment may be increased or diminished to adapt it for the required delivery with little, with much, or with a mean impetus.

Each of the compartments C C being separate and distinct from every other compartment, it follows that they may respectively be used for different grades of flour, bran, or offal, or, in the case of other materials, for different packages, grades, or brands of the same or different merchandise, and that any one compartment may be used indifferently and independently for storage or for continuous or intermittent delivery.

To prevent confusion, the means for controlling the delivery of the articles from the lower ends of the compartments are not indicated in the diagrams, Figs. 1, 2, and 3, but are shown drawn to a larger scale in and by Figs. 5 to 17, inclusive.

Figure 6:
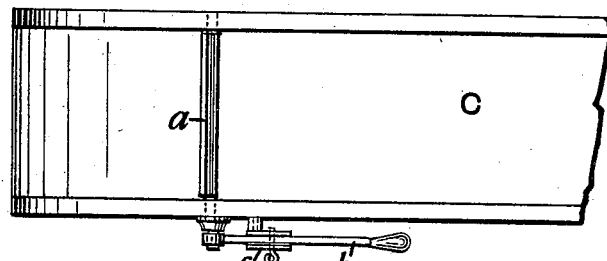
Figure 7:
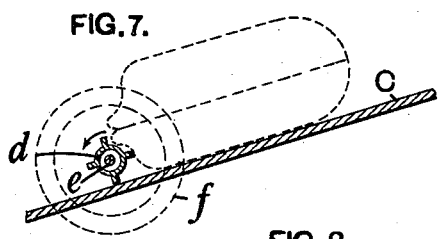

A simple form of stop which may be used at the bottom end of each compartment to temporarily retain the goods therein consists of a pivoted wing $a$, Figs. 5 and 6. This wing is normally vertical in the path of the articles and is pivoted at the level of the floor, so that when folded down the articles can ride over it. It is moved as required by the handle $b$, which may be secured to the quadrant $c$ in any position by means of a pin passing through a hole in the lever into one of a series of holes in the quadrant.

Figure 8:
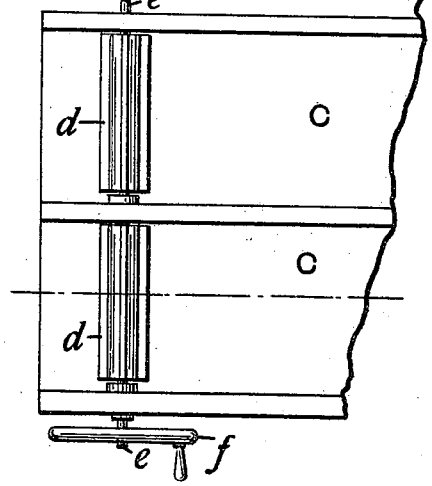

Figs. 7 and 8 illustrate a roller-stop. This consists of a roller $d$ at the foot of each compartment, in the periphery of which longitudinal recesses are formed. When the roller is at rest, the lowest sack rests against it; but when the roller is rotated in the direction indicated by the arrow the lowest sack is caused to ride over the roller, to be followed by other sacks so long as the rotation is continued. In the arrangement represented there is supposed to be a plurality of rollers upon a single shaft $e$, which is rotated by the hand-wheel $f$. In this case individual rollers may be connected with and disconnected from the shaft by known mechanisms, so that articles may be delivered from any compartment without interfering with those in the neighboring compartments, and the shaft may thus be continuously rotated by power. In the modification illustrated by Figs. 9 and 10 there are a plurality of roller-shafts, of which all but the first are geared to their rollers by the spur-toothed gearing $g$.

When a door or an equivalent stop is used at the foot of each compartment, as is often desirable, and it is required to deliver the articles one by one or in stated groups, I may employ the device illustrated by Figs. 11 and 12. This consists of a removable obstruction, such as the side wings $h\ h$, each of which is vertically pivoted against one of the side walls of a compartment, so that when the wing is folded against the wall the articles can pass freely, but which acts as a stop when it is extended toward the median line of the compartment. The lower end of each wing-pivot is provided with a horizontal extension $i$, which has pinned to it or to a bell-crank lever $j$, attached thereto, a catch $k$. Alongside the outer compartments there is mounted a reciprocable rod $l$, having a stud $m$ thereon for each catch. This rod can be reciprocated by means of the handle $n$ and quadrant $n'$, gearing with a rack on the lower end of the rod. When it is desired to deliver one article or so many articles as lie below the wing, the catch belonging to that compartment is engaged with its stud $m$ and the rod is drawn downward, so extending the wing into the compartment and acting as a stop to all the articles above it. The door being opened, the lower article or articles slide out. The door being reclosed, the rod is returned and the catch is disengaged.

It will be obvious that the side wings instead of being operated by the devices described with reference to Figs. 11 and 12 may be similarly operated by the opening of a door or the removal of a bolt.

The articles contained in a row of compartments or in a part of a row of compartments may be all ultimately delivered to a determined point by the construction illustrated by Figs. 13 and 14. The floors of the row or part of a row of compartments have a hinged extension $o\ o$, which gradually narrows and is provided with the converging side walls $o'\ o'$. As shown by the drawings, the open end of the tray extension comes over the conveyer-belt $p$. Each compartment may be fitted with the wings or roller-stops hereinbefore described, so as to limit the number of articles delivered from any one compartment or to limit the delivery from any one or more of the compartments communicating with the tray $o$. When the apparatus is out of use, the tray is raised to the position indicated by the dotted lines and then acts as a bottom stop to all the compartments.

In the modified arrangement shown by Figs. 15 and 16 the tray $o$ instead of being a permanent attachment to a row or part of a row of compartments can be mounted upon the truck $t$, or, as shown by the figures, it may be run under the mouths of the trays and act as a chute from them to a conveyer-belt or other receiver. The truck is mounted on flanged wheels to run on rails.

The modification illustrated by Fig. 17 is a development of that hereinbefore described with reference to Fig. 4. In that construction it was shown how the walls diverge from a straight line when the compartments are steep. Exactly the same construction is used when the compartments are respectively constructed about a vertical axis, only in that case what was before the inclined floor of the compartment becomes a vertical wall of the compartment, and there are a series of short floors $f\ f$ inclined alternately in opposite directions. The article committed to the compartment slides down the first stage 1 and across the compartment to the second stage 2, down which it slides across to stage 3, and so on to the full extent permitted. The aggregate inclined floor thus constructed may have in each of its stages a less inclination than that indicated by the drawing, especially if the articles to be stored therein be comparatively heavy. The roller device $d$ (illustrated by and described with reference to Figs. 7 to 10) may be conveniently used with this construction of the compartments. It is also desirable that the transportable tray $t$ should have its upper part inclined, as shown, to form a continuation of the lowest stage of the compartment-floor.

Having now particularly described my said invention, I declare that what I claim is—

1. In a structure for the storage and delivery of articles of merchandise a plurality of contiguous compartments having inclined floors, walls for said compartments which alternately approach toward and recede from the median line and form a zigzag path in each compartment and filling-pieces in the angles of said compartments, substantially as set forth.

2. In a structure for the storage and delivery of articles of merchandise comprising a plurality of contiguous compartments having inclined floors, a vertically-pivoted wing capable of being folded against the wall of the compartment with which it is used and of being extended into the compartment, a projection from the wing-pivot, a catch connected with the said projection, a longitudinal reciprocable rod having studs thereon adapted to be engaged by the said catches, and means for reciprocating the rod whereby the wing may be positioned to act as a stop or to be folded out of the way, substantially as set forth.

3. In a structure for the storage and delivery of articles of merchandise comprising a plurality of contiguous compartments having inclined floors, an inclined tray common to a series of compartments and having converging sides and an open end, so that articles delivered to the tray from any compartment slide down it and are delivered from the open narrow end, substantially as set forth.

4. In a structure for the storage and delivery of articles of merchandise comprising a plurality of contiguous compartments having inclined floors, a truck having an inclined table thereon with convergent sides, adapted to be moved to a series of compartments and to receive goods from them or any of them and to deliver the said goods from its narrow lower end, substantially as set forth.

In witness whereof I have subscribed my signature in presence of two witnesses.

RICHARD EDMUND LEETHAM.

Witnesses:
 CHARLES DOWNEY,
 GEORGE WILLIAM CURRY.